United States Patent [19]
Schwiegk et al.

[11] Patent Number: 5,854,305
[45] Date of Patent: Dec. 29, 1998

[54] PLUGGING COMPOUND FOR CHEMICAL FASTENING

[75] Inventors: Stefan Schwiegk, Neustadt; Wolfgang Hübinger, Limburgerhof; Thomas Folda, Neustadt; Peter Ittemann, Lampertheim; Willi Riegel, Waghäusel; Monika Moench, Landsberg; Peter Mauthe, Tuerkheim, all of Germany

[73] Assignee: DSM Resins B.V., Zwolle, Netherlands

[21] Appl. No.: 701,389

[22] Filed: Aug. 22, 1996

[30] Foreign Application Priority Data

Aug. 29, 1995 [DE] Germany .................. 195 31 649.5

[51] Int. Cl.$^6$ .................. C09K 17/00; C08K 5/3412; E21D 20/00
[52] U.S. Cl. .................. 523/130; 106/608; 405/259.6; 524/99; 524/104
[58] Field of Search .................. 526/83; 405/259.6; 106/608; 523/130

[56] References Cited

U.S. PATENT DOCUMENTS 5,256,723  10/1993  Hense et al. .................. 206/219
5,290,888  3/1994  Gatechair et al. .................. 526/83

*Primary Examiner*—Tae Yoon
*Attorney, Agent, or Firm*—Oblon, Spivak, McClelland, Maier & Neustadt, P.C.

[57] ABSTRACT

A plugging compound for the chemical fastening of anchor bolts, threaded sleeves and screws in drill-holes, comprising a reactive resin and—spatially separated therefrom—a curing agent for the resin, includes from 0.0005 to 2% by weight of a piperidinyl or tetrahydropyrrolyl nitroxide as inhibitor in the reactive resin.

10 Claims, No Drawings

PLUGGING COMPOUND FOR CHEMICAL FASTENING

The use of reactive resin compositions as binders for the art of chemical fastening is well known. The reactive resin compositions in question are two-component systems, in which one component comprises the reactive resin and the other the curing agent. Either or both of the components may include other, customary constituents such as fillers, accelerants, stabilizers, solvents including reactive solvents (comonomers). Mixing the two components then leads to the formation of free radicals and the initiation of the reaction which thermosets the resin.

To fix anchor bolts in holes drilled in concrete or solid rock it is customary to use capsules having 2 chambers to keep the components separated (see for example EP-A 150 555). The capsule itself is preferably made of brown glass, but it is also possible to use capsules made of UV-stabilized film, for example in polyethylene, polyethylene terephthalate or corresponding composite materials. The capsule is inserted into the drill-hole, before the fastening element is introduced by rotary percussion, destroying the capsule and the chambers. The two components become mixed, initiating the reaction. The cured resin composition is capable of inducting force into the substrate without lateral expansion pressure. Such anchorages proved useful in particular for heavy-duty fixtures.

Two-chamber cartridges can be used particularly in the case of anchorages in porous or cavitied substrate, for example in foamed concrete block or in cavity brick, but also in solid rock, brick and concrete (see for example DE-A 36 17 702). The two components of the plugging compound are simultaneously expressed from the cartridge, mixed by suitable means, for example screws, and forced into the drill-hole. The drill-hole can then be entered directly with an anchorable fastening element of any desired cross-section, which becomes fixed in the drill-hole when the resin has cured; or first an internally threaded sleeve is inserted into the hole and fixed in place by the curing of the resin, and screws or bolts can then be screwed or bolted in. In the case of cavity brick, the drill-hole is first lined with a mesh-type, cylindrical sleeve made of plastic or metal. The resin is then forced in from the two-chamber cartridge. Insertion of an internally threaded sleeve then forces plugging compound through the openings of the perforated sleeve, so that a firm anchorage develops on curing of the plugging compound.

In the case of anchorages behind Rigips board or in hollow-chamber brick, the cartridges employed comprise foamable adhesive compositions as described for example in EP-A 338 983. One component of the plugging compound comprises an inorganic carbonate, for example chalk, while the other component comprises an acid, for example polyacrylic acid or phosphoric acid. The drill-hole is lined with an internally threaded sleeve or a perforated sleeve, and the foamable plugging compound is forced in. As the components become mixed, $CO_2$ is released and causes the plugging compound to foam up and fill out the hollow spaces or form a mushroom-shaped anchorage behind the board within which the fixture becomes anchored as the plugging compound cures.

Suitable reactive resin for the chemical fastening art are vinyl ester and vinyl ester urethane resins as described for example in EP-A 150 555, EP-A 199 671, EP-A 508 183 and EP-A 534 201. These resins customarily include inhibitors for stabilization against premature polymerization, for example hydroquinone, substituted hydroquinones, benzoquinone, tert-butylpyrocatechol or phenothiazine.

These inhibitors provide the resin with a storage stability of several months, although only in the presence of oxygen dissolved in the resin. If the resin is stored in the absence of air, polymerization starts within a few days. For this reason, plugging compounds had hitherto to be packed in such a way that the resin could come into contact with air. However, an airtight package would be stronger and simpler to make.

It is an object of the present invention to provide an inhibitor which ensures a sufficiently long storage stability in the case of airtight packages and also in the presence of light A specific embodiment of the chemical fastening art is described in DE-A 42 31 161. In this prior art, the reactive resin component additionally includes a hydraulically setting or polycondensable inorganic compound, for example cement, and the curing agent component additionally includes water. It has now been found that the action of customary phenolic inhibitors is destroyed by the alkaline cement. The resin cures prematurely in places, so that the actual curing when the components are mixed is rendered nonuniform and badly cured regions develop in the anchoring. The pullout resistance of the bolt suffers of course as a result. It is a further object of the present invention to provide an inhibitor whose action is not adversely affected even in the case of the specific cementitious embodiment.

We have found that these objects are achieved according to the invention when a piperidinyl or tetrahydropyrrolyl nitroxide is used as inhibitor.

The present invention accordingly provides a plugging compound for the chemical fastening of anchor bolts, threaded sleeves and screws in drill-holes, comprising I. a free-radically curable reactive resin, comprising from 0.0005 to 2% by weight of a piperidinyl or tetrahydropyrrolyl nitroxide inhibitor, and II. —spatially separated therefrom—a curing agent for the resin.

Suitable reactive resins include vinyl ester resins and vinyl ester urethane resins.

1. Unsaturated vinyl ester resins (epoxy-acrylates) are addition products of polyepoxides with unsaturated monocarboxylic acids, preferably methacrylic acid. These resins are described for example in U.S. Pat. Nos. 3,066,112 and 3,179,623, preference being given to using vinyl ester resins based on bisphenol A. They have high toughness and good chemical resistance combined with limited heat resistance. By contrast, vinyl ester resins from epoxy novolak resins and (meth)acrylic acid, as described for example in U.S. Pat. No. 3,256,226, have higher heat resistance, but lower toughness.

The characteristic feature of this class of vinyl ester resins is the group

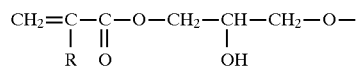

where R is H or $CH_3$.

Another class of vinyl ester resins are esterification products of optionally alkoxylated bisphenol A with (meth) acrylic acid, for example as described in EP-A 534 201.

2. Unsaturated vinyl ester urethane resins (urethane acrylates) generally have the following groups:

a) 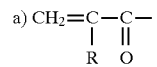

(where R is H or CH$_3$).

b) 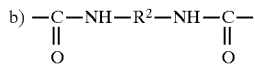

(where R$^2$ is a bivalent aliphatic, aromatic or cycloaliphatic radical having from 4 to 40 carbon atoms, preferably an aromatic radical having from 6 to 20 carbon atoms), optionally c) 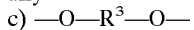

(where R$^3$ is an aliphatic, cycloaliphatic or aromatic radical having from 2 to 100 carbon atoms).

Preferably the vinyl ester urethane resin is a reaction product of a polyfunctional isocyanate,
optionally a polyhydric alcohol,
optionally a polyhydric amine,
a hydroxyalkyl (meth)acrylate, in a weight ratio of isocyanate to (alcohol+amine) within the range from 100:0 to 100:300, the equivalent ratio of hydroxyalkyl (meth)acrylate to the free isocyanate groups of the reaction product being within the range from 3:1 to 1:2.

The reactive resins include from 10 to 80, preferably from 30 to 60, % by weight of comonomers.

Preferred comonomers include methacrylic esters, for example 2-ethylhexyl methacrylate, phenylethyl methacrylate, tetrahydrofurfuryl methacrylate, ethyltriglycol methacrylate, N,N-dimethylaminoethyl methacrylate, N,N-dimethylaminomethyl methacrylate, 1,4-butanediol dimethacrylate, acetocarboxyalkyl methacrylate, acetoacetoxyethyl methacrylate, 1,2-ethanediol dimethacrylate, isobornyl methacrylate, diethylene glycol dimethacrylate, methoxypolyethylene glycol monomethacrylate, trimethylcyclohexyl methacrylate, trimethylolpropane trimethacrylate, 2-hydroxyethyl methacrylate, hydroxypropyl methacrylate and dicyclopentyloxyethyl methacrylate. Butanediol dimethacrylate is particularly preferred.

Acrylic esters are less preferable, since they are usually skin irritants and provide low hydrolysis resistance.

In principle, it is also possible to use other customary comonomers, alone or mixed with the methacrylic esters, for example styrene, α-methylstyrene, alkylated styrenes, such as tert-butylstyrene, divinylbenzene and allyl compounds.

According to the invention, the plugging compound includes from 0.0005 to 2, preferably from 0.1 to 1, % by weight of a piperidinyl or tetrahydropyrrolyl nitroxide as inhibitor. These are nitroxyls (nitroxide free radicals) of the formula

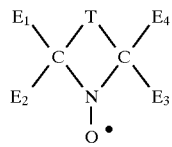

where E$_1$ and E$_3$ are independently of each other C$_1$–C$_5$-alkyl or phenyl, E$_2$ and E$_4$ are independently of each other C$_1$–C$_5$-alkyl, or E$_1$ and E$_2$ together, or E$_3$ and E$_4$ together, are tetramethylene or pentamethylene, and T is a bivalent group which, together with the nitrogen atom and the two tertiary carbon atoms, forms a 5- or 6-membered ring, and T may be substituted or unsubstituted.

Preference is given to 4-hydroxy-2,2,6,6-tetramethylpiperidin-1-yloxy.

In a preferred embodiment, the plugging compound additionally includes from 0.005 to 2, preferably from 0.05 to 1, % by weight of a conventional inhibitor, especially a phenol, quinone or phenothiazine, e.g. 2,6-di-tert-butyl-p-cresol.

Examples of reinforcing fillers for the reactive resin include quartz, glass, corundum, porcelain, stoneware, baryte, lightspar, gypsum, talc and chalk. The fillers are mixed in the form of sands, powders or specific shapes (cylinders, spheres, etc.) either into the resin solution and/or the hardener (initiator). The fillers can be used as fibers (fibrillar fillers). Preferable and more reinforcing are globular inert materials (ball shape).

Peroxide curing agents are customarily used together with accelerants, which are advantageously arranged spatially together with the resin, i.e. separate from the hardener. Suitable accelerants include aromatic amines such as N,N-dimethylaniline, N,N-diethylaniline; toluidines and xylidines such as N,N-diisopropanol-para-toluidine, N,N-dimethyl-p-toluidine, N,N-bis(2-hydroxyethyl)xylidine and -toluidine; also cobalt, manganese, tin and cerium salts, for example cobalt octoate or naphthenate.

The reactive resin should preferably have a viscosity within the range from 30 to 5,000 mPa.s at 23° C.

In the plugging compound of this invention, the curing agent is arranged spatially separated from the resin. Preferred curing agents include storage-stable organic peroxides. Particularly highly suitable are dibenzoyl peroxide and methyl ethyl ketone peroxide, also tert-butyl perbenzoate, cyclohexanone peroxide, lauroyl peroxide and cumene hydroperoxide, and also tert-butyl peroxy-2-ethylhexanoate.

The peroxides are preferably used in amounts of from 0.5 to 10% by weight, preferably from 3 to 7% by weight, based on the reactive resin.

The curing agents are advantageously applied phlegmatized by inert fillers, quartz sands being preferred.

In a particularly preferred embodiment of the invention, component I, as well as the reactive resin, additionally includes a hydraulically setting or polycondensable inorganic compound, especially cement, and component II, as well as the curing agent, additionally includes water. Such plugging compounds are described in detail in DE-A 42 31 161.

In general, the form of packaging chosen is that of a two-chamber capsule. A proven form of capsules are glass capsules, since the glass becomes finely ground in the course of the mixing process and then becomes integrated in the binder matrix as a reinforcing filler. It is also possible to use multichamber capsules made of ceramic material, as described for example in DE-A 39 29 603.2, and also capsules made of films, for example in polyethylene, polyethylene terephthalate or laminate materials.

The cartridges used are preferably two-chamber cartridges in which the larger chamber holds the resin and the smaller chamber the curing agent, in each case together with filler. In the case of foamable adhesive compositions it is advantageous to add the carbonate to the resin, while the acid component may be housed either together with the curing agent in one chamber or else in a separate chamber.

The resins with the inhibitors of this invention can be used for chemical fastening without any special provisions. Anchorages of this type exhibit good crack propagation characteristics, low volume shrinkage, good hydrolysis resistance and good heat resistance and also excellent adhesion to mineral receiving materials, such as concrete, natural stone and also to foamed and cavity block. The plugging compounds are notable for particularly good storage stability, even in the absence of atmospheric oxygen. Cementitious plugging compounds comprising the inhibitors of this invention are cured uniformly.

In the Examples, the percentages are by weight.

EXAMPLES 1a. 300 g of the isomer mixture of diphenylmethane diisocyanate are admixed with 1 ml of dibutyltin dilaurate. 37 g of dipropylene glycol are added dropwise at 40° C. The mixture is subsequently stirred for one hour. Then 280 g of hydroxypropyl methacrylate are added dropwise, and the reaction temperature rises to 80° C. The mixture is subsequently stirred at 90° C. until the residual isocyanate content has dropped to below 0.01% (melt viscosity about 750 mPa.s at 100° C). The resin is inhibited with 6.7 g of 4-hydroxy-2,2,6,6-tetramethylpiperidin-1-yloxy and also 2.7 g of 2,6-di-tert-butyl-p-cresol. 535 g of 1,4-butanediol dimethacrylate and 133 g of acetoacetoxyethyl methacrylate are added as reactive diluent. An aromatic amine is added to adjust the gel time to about 3.5 min. The resin has a viscosity of about 250 mPa.s. Stored at 80° C. in daylight in the absence of air, the resin is still stable 3 weeks later. Stored under light in a Suntest CPS Plus from Heraeus the sample is stable for 3 weeks.

1b. Batch 1a was repeated using a mixture of 5.1 g of tert-butylpyrocatechol and 0.13 g of phenothiazine as inhibitor. Stored in the absence of air at 80° C. this resin became gelled within 5 hours. Stored under light in the Suntest the sample gels within 3 hours.

2. 1475 g of a prepolymeric diisocyanate based on 1286 g of 4,4'-diphenylmethane diisocyanate are predissolved in 1320 g of styrene at 40° C. 1.3 ml of dibutyltin dilaurate are added, followed by the dropwise addition of 125 g of dipropylene glycol and 74 g of polypropylene glycol (OH number 250). After the exothermic reaction has died down, the mixture is stirred for one hour, and then 1195 g of hydroxypropyl methacrylate are added dropwise. On completion of the addition a further 1.3 ml of dibutyltin dilaurate are added, and the batch is subequently stirred at 80° C. until the residual isocyanate content has dropped to below 0.01%. The resin is inhibited with 16.8 g of 4-hydroxy-2,2,6,6-tetramethylpiperidin-1-yloxy. An aromatic amine is added to adjust the gel time to about 3.5 min. The resin has a viscosity of about 460 mPa.s.

3. To 300 g of bisphenol A diglycidyl ether (Epikote 828 from Shell) are added 1.3 g of 2,6-di-tert-butyl-p-cresol and also 0.36 g of dimethylbenzylamine. 136 g of methacrylic acid are then added dropwise at 85° C. while the internal temperature is raised to 110° C. The batch is stirred under air until the acid number has reached the switchoff value ≦15 units. Then the resin is inhibited with 3.4 g of 4-hydroxy-2,2,6,6-tetramethylpiperidin-1-yloxy. 170 g of 1,4-butanediol dimethacrylate and 68 g of acetoacetoxyethyl methacrylate are added as reactive diluent. An aromatic amine is used to adjust the gel time to about 3.5 min.

4. 1000 g of the esterification product of predominantly bis-ethoxylated bisphenol A with methacrylic acid are heated to 50° C. The resin is then inhibited with 5 g of 4-hydroxy-2,2,6,6-tetramethylpiperidin-1-yloxy. An aromatic amine is used to adjust the gel time to about 3.5 min. The resin has a viscosity of about 1600 mPa.s.

We claim:

1. A plugging compound for the chemical fastening of anchor bolts, threaded sleeves and screws in drill-holes, comprising
   I. a free-radically curable reactive resin, comprising from 0.0005 to 2% by weight of an inhibitor, and
   II. —spatially separated therefrom—a curing agent for the resin,
   wherein the inhibitor is a piperidinyl or tetrahydropyrrolyl nitroxide.

2. A plugging compound as claimed in claim 1, wherein the reactive resin comprises at least 20% by weight of a vinyl ester or vinyl ester urethane resin.

3. A plugging compound as claimed in claim 1, wherein the resin includes a methacrylic ester as comonomer.

4. A plugging compound as claimed in claim 1, wherein the resin includes an accelerant for the curing agent.

5. A plugging compound as claimed in claim 1, wherein the resin additionally includes a conventional inhibitor.

6. A plugging compound as claimed in claim 5 additionally comprising a phenol, a quinone or a phenothiazine.

7. A plugging compound as claimed in claim 1, wherein the curing agent is an organic peroxide which is used in amounts of from 0.5 to 10% by weight, based, on the resin.

8. A plugging compound as claimed in claim 1, wherein component I additionally includes a hydraulically setting or polycondensable inorganic compound and component II additionally includes water.

9. A capsule, cartridge or film bag comprising a plugging compound as claimed in claim 1, having two or more mutually separated chambers accommodating, respectively, the resin and the curing agent.

10. A plugging compound as claimed in claim 4, wherein said accelerant is a tertiary organic amine.

* * * * *